United States Patent
Dijon et al.

(10) Patent No.: US 8,675,150 B2
(45) Date of Patent: Mar. 18, 2014

(54) LIGHTING DEVICE FOR LIQUID CRYSTAL SCREEN

(75) Inventors: Jean Dijon, Champagnier (FR); Thierry Leroux, Caen (FR)

(73) Assignee: Commissariat a l'Energie Atomique, Paris (FR)

( * ) Notice: Subject to any disclaimer, the term of this patent is extended or adjusted under 35 U.S.C. 154(b) by 427 days.

(21) Appl. No.: 12/602,940

(22) PCT Filed: Jun. 3, 2008

(86) PCT No.: PCT/EP2008/056808
§ 371 (c)(1),
(2), (4) Date: May 14, 2010

(87) PCT Pub. No.: WO2008/155215
PCT Pub. Date: Dec. 24, 2008

(65) Prior Publication Data
US 2011/0043723 A1    Feb. 24, 2011

(30) Foreign Application Priority Data
Jun. 11, 2007 (FR) ..................... 07 55637

(51) Int. Cl.
G02F 1/1335 (2006.01)
G09F 13/04 (2006.01)

(52) U.S. Cl.
USPC ........................................... 349/64; 362/97.3

(58) Field of Classification Search
None
See application file for complete search history.

(56) References Cited

U.S. PATENT DOCUMENTS

| | | | |
|---|---|---|---|
| 5,061,050 A | 10/1991 | Ogura | |
| 2004/0105055 A1 | 6/2004 | Yu et al. | |
| 2004/0119400 A1* | 6/2004 | Takahashi et al. | 313/504 |
| 2004/0239848 A1* | 12/2004 | Yeh et al. | 349/114 |
| 2004/0245926 A1* | 12/2004 | Bechtel et al. | 313/582 |
| 2005/0253158 A1* | 11/2005 | Yasukawa et al. | 257/98 |
| 2006/0082700 A1* | 4/2006 | Gehlsen et al. | 349/64 |
| 2007/0031685 A1* | 2/2007 | Ko et al. | 428/447 |
| 2008/0231729 A1* | 9/2008 | Sato et al. | 348/229.1 |
| 2008/0255812 A1* | 10/2008 | Hery | 703/2 |

FOREIGN PATENT DOCUMENTS

| | | |
|---|---|---|
| EP | 1 548 794 A | 6/2005 |
| EP | 1 775 751 A | 4/2007 |
| JP | 63-168626 | 12/1988 |
| JP | 6-265892 | 9/1994 |
| JP | 11-7016 | 1/1999 |
| JP | 2001-147321 | 5/2001 |
| JP | 2002-245928 | 8/2002 |
| JP | 2006-84813 | 3/2006 |

OTHER PUBLICATIONS

English translation of Japanese Office Action mailed Oct. 1, 2013, for corresponding Japanese Application No. 2010-511579 (2 pages).

* cited by examiner

*Primary Examiner* — Tina Wong
(74) *Attorney, Agent, or Firm* — Baker & Hostetler LLP

(57) ABSTRACT

A lighting device for liquid crystal display provides as output a polarized extended light flux. It comprises a light source 100 comprising a layer with high albedo A on the light emission surface $S_D(A)$, on which are stacked a quarter-wave plate 101 and a reflecting polarizer 103. This results in a light transmission gain of the order of 1+A, which makes it possible to produce displays with high luminance and low electrical consumption.
Application to flat-screen displays.

16 Claims, 6 Drawing Sheets

LIGHTING DEVICE FOR LIQUID CRYSTAL SCREEN

PRIORITY CLAIM

This application claims priority to PCT Patent Application Number PCT/EP2008/056808, entitled Lighting Device for Liquid Crystal Screen, filed on Jun. 3, 2008.

DOMAIN OF THE INVENTION

The present invention relates to a lighting device for liquid crystal screen, in particular for use in low-consumption flat-screen displays.

The invention relates notably to a lighting device for screens of transmissive type. As illustrated schematically in FIG. 1, these screens comprise in a conventional manner, going from their rear face to their front face, an "entrance" polarizer P1, a first transparent substrate S1 whose internal face bears a network of control electrodes, a thickness of liquid crystal XL, a second transparent substrate S2 whose internal face bears a counter-electrode, and optionally a color filter network, and an "exit" polarizer P2, on the front face. An observer looks at the image which is formed on the front face of such a screen. These screens require lighting from the rear, that is to say back-lighting.

TECHNICAL BACKGROUND

According to the prior art, this lighting of the rear face is carried out by means of an unpolarized light source 1. This source can be neon tubes associated with optical devices for rendering the luminous flux uniform. Another technology uses light-emitting diodes, associated with complex optics able to mix the light of the various diodes to provide an extended uniform flux of white light.

The light source provides an extended light flux L towards the entrance polarizer P1 of the screen $C_{XL}$. The entrance polarizer thus absorbs theoretically 50% of the light emitted by the source L (dichroic polarizer), and lets through only the light in the corresponding polarization of that of the polarizer. In fact, and as shown diagrammatically in FIG. 2, the actual rate of light transmission by the entrance polarizer is of the order of 40% of the light flux L emitted by the source, on account of transmission losses in the entrance polarizer. For these reasons, powerful sources, having high electrical consumption, are necessary for producing high-luminance displays.

SUMMARY OF THE INVENTION

In the invention, a technical solution has been sought making it possible to improve the degree of light transmission, so as to reduce the electrical consumption of liquid crystal displays, without degrading their performance notably in terms of luminance.

A lighting device meeting this need has been found in the invention, which comprises a stack of optical elements, disposed and chosen so as to favor the transmission of a flux of polarized light in an effective manner.

The invention relates to a diffuse lighting device for transmissive liquid crystal screen, comprising a luminous source of an extended flux of unpolarized light, characterized in that it comprises a diffusing layer exhibiting a high albedo, at least greater than 0.3, on the light emission surface of said source, and in that on the source is disposed a stack of a quarter-wave plate and of a reflecting polarizer, said reflecting polarizer being such that the light which does not cross said polarizer is at least in part reflected via said plate toward said layer of high albedo.

The lighting device obtained is advantageously compact.

The high-albedo layer is advantageously a phosphor layer. This layer can be structured as bands of phosphor of various colors.

In a refinement, a mirror layer is placed under the phosphor layer, to reflect the light toward the polarizer.

The invention also relates to various embodiments of the device pertaining to structural aspects of the source and/or of the polarizer which make it possible to further improve the efficiency of the lighting device.

The invention also relates to a display comprising a liquid crystal screen associated with a lighting device according to the invention, disposed on the rear face.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

DETAILED DESCRIPTION OF THE INVENTION

Figure 3A:
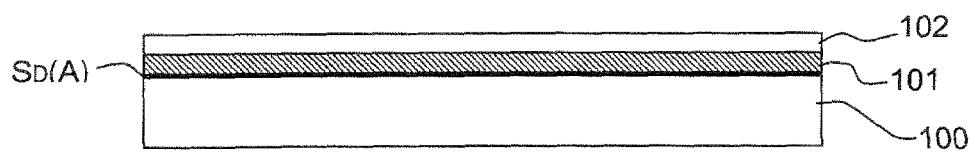
FIGS. 3a and 3b illustrate respectively a basic diagram of a lighting device according to the invention providing as output an extended flux of polarized light, and the optical tracks of the light in this device between the emitting light source and the output surface.
Figure 3B:
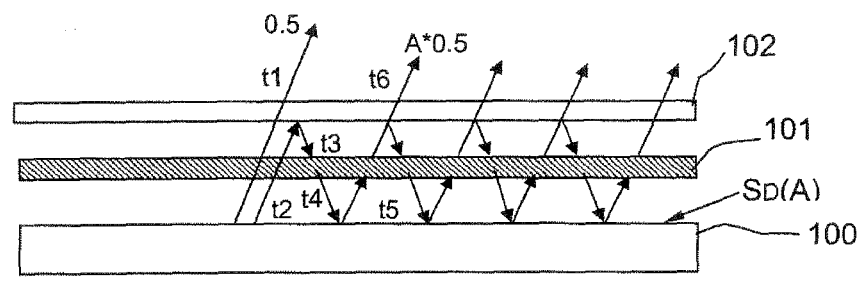

As illustrated in FIGS. 3a and 3b, a lighting device according to the invention comprises the superposition of an unpolarized extended light source 100, a quarter-wave plate 101 and a reflective polarizer 102.

In the source, a light emission surface $S_D(A)$ is a layer with high albedo A.

The albedo is the measure of the capacity of a surface to reflect light diffusely (that is to say in all directions in space). It is expressed by a number lying between 0 and 1, corresponding to the ratio of the quantity of light reflected to the quantity of light received: a surface which reflects all the light has an albedo of 1, a surface which absorbs it 100% has an albedo of 0. In the invention, by high albedo A is meant an albedo of greater than or equal to about 0.3 (or indeed greater than or equal to 0.5): at least 30% of the light received is reflected, the remainder being absorbed.

The principle of the device is more particularly illustrated in FIG. 3b: the unpolarized light is emitted by the source 100 toward the polarizer 102. The light whose wave polarization plane coincides with the polarization axis of the polarizer is transmitted toward the exterior by the polarizer: this is the optical track t1 illustrated in FIG. 3b; whereas the light whose wave polarization plane is orthogonal to the polarization axis of the polarizer (illustrated by the track t2 in the figure), is reflected by the polarizer toward the emission surface $S_D(A)$ (track t3). Along its track t3, the light crosses through the quarter-wave plate 101, thus rotating the plane of polarization by about 45°, before reaching the emission surface $S_D(A)$ (track t4). Having regard to the high albedo of this surface, the latter diffuses the light back toward the polarizer 102 (track t5). On its track t5, the light crosses back through the quarter-wave plate so that its polarization plane has rotated in total by about 90° when it reaches the polarizer: the polarization plane then coincides with the polarization axis of the polarizer and the light will pass through the polarizer and be transmitted to the exterior (track t6).

The lighting device according to the invention thus provides a polarized light flux as output from the polarizer 102, with limited loss of light in the device. According to the principle described above, the quantity of light transmitted relative to the quantity L of light emitted by the source 100 can be written: $L_T=(1+A.)0.5.L$, where A is the albedo of the emission surface $S_D(A)$ of the source 100.

In fact the mechanism is a little more complex than the principle set out above since it is known that the quarter-wave plate introduces a shift of 45° only for certain wavelengths. This shift is therefore different for the other wavelengths. Nevertheless, the light which is not transmitted by the polarizer is not lost: it is reflected successively between the emission surface $S_D(A)$ of the source 100 and the polarizer 102 undergoing a shift each time it crosses the quarter-wave plate, until a polarization is obtained allowing its transmission to the exterior by the polarizer.

This phenomenon of multiple reflection thus makes it possible to increase the luminous efficiency. This phenomenon also makes it possible to limit the performance constraints of the quarter-wave plate: indeed, it is not necessary for the shift introduced to be very precisely 45°, since whatever is not transmitted directly by the polarizer will end up, after multiple reflections, being transmitted (to within losses).

Figure 1:
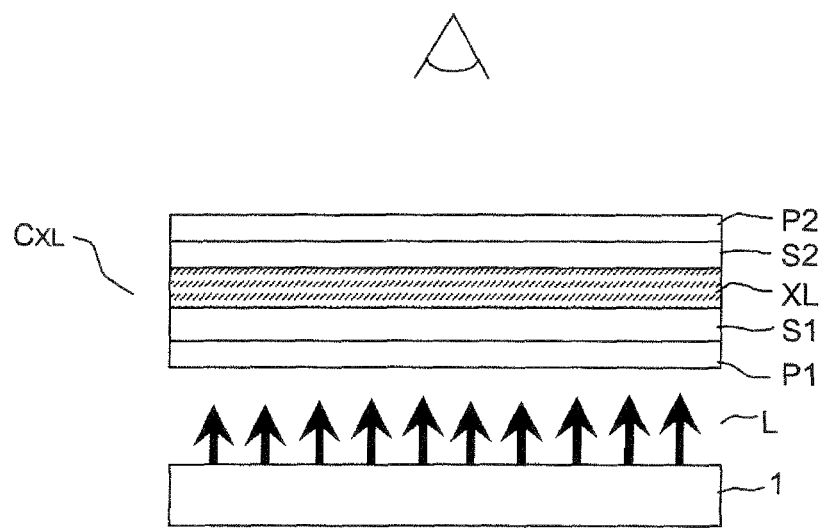
FIG. 1 illustrates a structure of a liquid crystal display with back-lighting according to the prior art.
Figure 2:
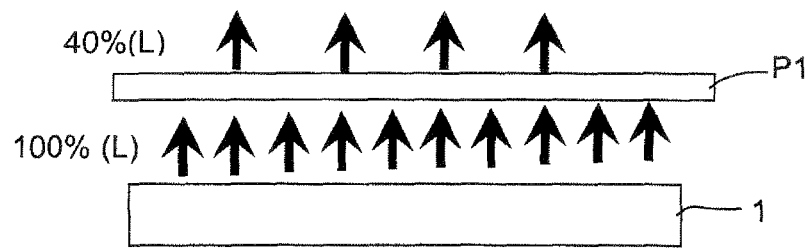
FIG. 2 depicts the phenomenon of light loss in such a display.

If such a source is associated with a liquid crystal screen according to the assembly illustrated in FIG. 1, considering the polarizer 102 as constituting the entrance polarizer P1, a gain of (1+A) in light transmission relative to the prior art is thus produced, neglecting the losses in the polarizer itself (of the order of 10%). It will be noted that it is also possible to retain the entrance polarizer of the screen.

A lighting device according to the invention allows a more powerful light flux to reach the screen, for equal electrical power.

For equal luminance, there is a reduction in the electrical consumption of the display in the same proportions, relative to the prior art.

Three exemplary embodiments of a lighting device according to the invention are detailed hereinafter by way of illustration. For the sake of simplification, in the figures, the same elements bear the same references.

Figure 4:
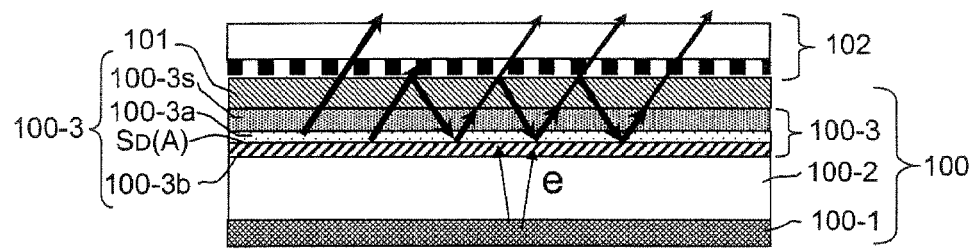
FIG. 4 illustrates a first embodiment of a lighting device according to the invention.

FIG. 4 illustrates a first exemplary embodiment, in which the light source 100 is a field emission device combined with a phosphor layer, which transforms the emitted electrons into photons. More generally, the light source 100 is a device comprising a phosphor layer able to generate photons on the basis of an electrical signal, either by catholuminescence, in this case the phosphors transforming incident electrons into photons, or by luminescence, in this case the phosphors transforming UV radiation into photons (plasma source). In the case of a field emission device, the latter comprises in a usual manner a cathode 100-1 which comprises the emitters of electrons e, and a transparent anode 100-3 opposite, at some distance from the cathode, the anode and the cathode being separated by a space 100-2 in which a vacuum has been created. An electrical voltage Va, typically 10000 to 15000 volts, is applied between the anode and the cathode to allow the emission of the electrons under the effect of the strong electric field. The phosphor layer is referenced 100-3b in the example and disposed on the anode 100-3, facing the electron emitters. The electrons emitted by the emitters and directed toward the anode under the effect of an electric field applied between the anode and the cathode will bombard the phosphor layer, which emits photons by absorption of electrons in accordance with the well-known phenomenon of cathode luminescence.

A typical albedo of a phosphor layer is of the order of 0.5. The albedo is dependent on the material of the phosphor layer. Among the possible materials may be cited for example $Y_2O_2S$: Eu, ZnS: CuAl, $Y_2SiO_5$: Tb, $Y_2SiO_5$: Ce, $Y_2O_3$: Eu, AlN: Eu. The emission surface $S_D(A)$ with high albedo according to the invention (FIGS. 3a, 3b) thus typically corresponds to the surface of this phosphor layer.

It will be noted that FIG. 4 more particularly illustrates a so-called diode-type field emission device, that is to say having two control electrodes: the cathode and the anode. An example of such a diode structure is more particularly detailed in FIG. 8a, for a cold cathode, with carbon nanotubes as emitters.

But it may be preferred to use a field-effect device with triode structure in the lighting device according to the invention. Such a structure is illustrated in FIG. 8b, in the case of a cold cathode, with microtips as emitters, for example molybdenum microtips (the triode and diode structures can equally well be used with carbon nanotubes as with microtips). In a well-known manner the triode structure comprises a grid g disposed in proximity to the emitters, between the emitters and the anode, which facilitates the extraction of the electrons at lower electrical voltage Vg applied to the grid, typically 100 volts, the electric field between cathode and anode making it possible to direct these electrons toward the anode. Such a triode structure furthermore makes it possible in a variant to modulate zone-wise the current emitted by the cathode, by providing a matrix grid cathode structure, with as many individually controllable grid elements g as zones, as for example described in patent application FR 2 873 852. The benefit of such a triode structure in a lighting device according to the invention will be seen later in connection with FIG. 7.

In practice, and as illustrated in FIG. 4, the anode 100-3 is typically made on the basis of a transparent support 100-3s, on which a transparent conducting layer 100-3a is deposited, for example a layer of ITO, to form the actual "anode" electrode, to which a voltage is applied (Va, FIG. 8a-8b), followed by the phosphor layer 100-3b.

The quarter-wave plate 101 centered in the emission range of the phosphors is typically a polymer film (available commercially), which is glued onto the upper face of the support 100-3s of the anode.

In the example illustrated the reflecting polarizer is a grid polarizer. Such a polarizer is well known. It will be possible notably to refer to document WO 2007/044028. It typically comprises metallic bands in the form of fine lines, regularly spaced, and obtained for example by etching. The spacing of the grid is determined so as to optimize the effectiveness of the reflection and of the polarization. It is typically of the order of 0.2 µm (micrometers). The person skilled in the art knows how to make in this way a polarizer with very good spectral and angular polarization performance, as a function of the desired range of wavelengths (depending on the application concerned).

Figure 5:
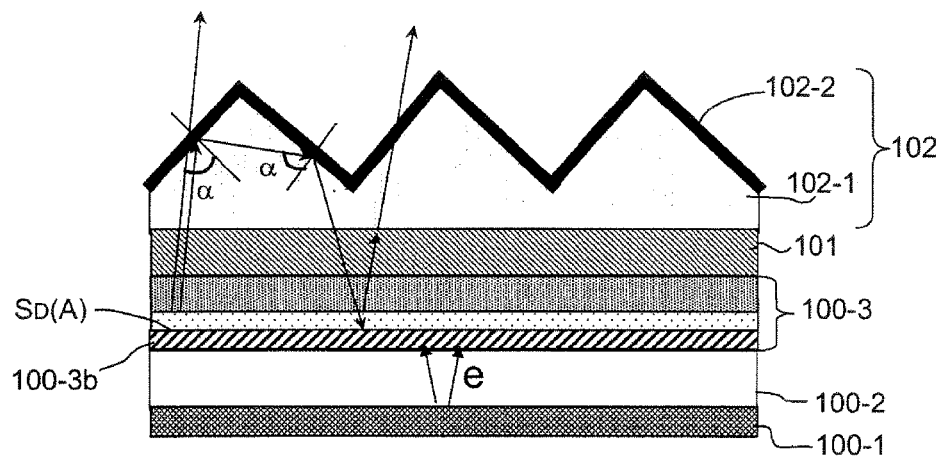
FIG. 5 illustrates a second embodiment of a lighting device according to the invention.

FIG. 5 illustrates a second embodiment of a lighting device according to the invention, which differs from the previous one in the construction of the reflecting polarizer. Here the reflecting polarizer comprises a structure having reflecting facets. It is typically formed by a structure having reliefs, for example a thick layer of molded polymer, typically 1 mm, on which are deposited several dielectric thin optical layers forming an optical stack. The advantage of this type of polarizer relative to the grid polarizer is that the optical layers are deposited full plate. This polarizer which does not require any accurate etching can therefore be obtained at lesser cost on large surfaces. The relief structure can consist of pyramids typically with a base of 1 millimeter and base angle of about 45°. The optical stack is chosen (choice of materials/thicknesses) so as to make a 45° reflecting polarizer on this relief structure. The base angle, the spacing and also the stack can easily be optimized by the person skilled in the art as a function of the spectral range of the phosphors.

Figure 9:
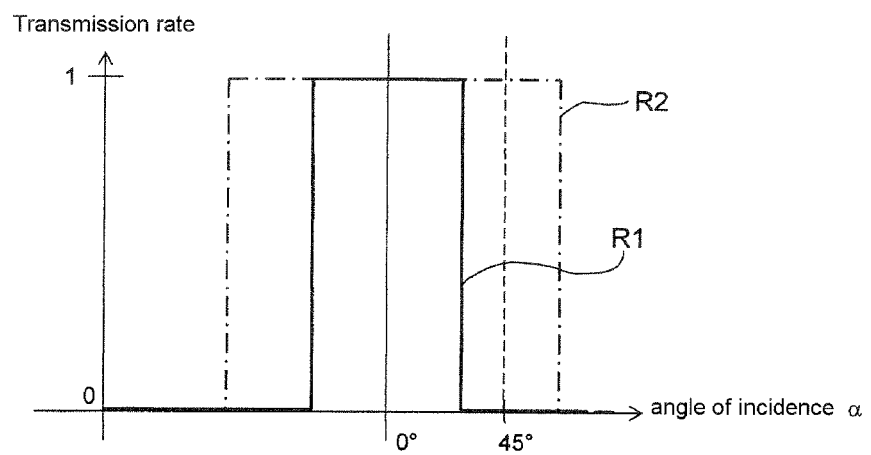
FIG. 9 illustrates the angular response of a reflecting multilayer polarizer.

FIG. 9 illustrates the principle of a 45° polarizer. The light ray is composed of 2 orthogonal components (in general dubbed s and p) each containing 50% of the energy. Curves R2 and R1 represent the respective transmission of these 2 components as a function of the angle of incidence. It may be noted that at around 45°, only one of the 2 components is transmitted, the other being for its part reflected.

Figure 6A:
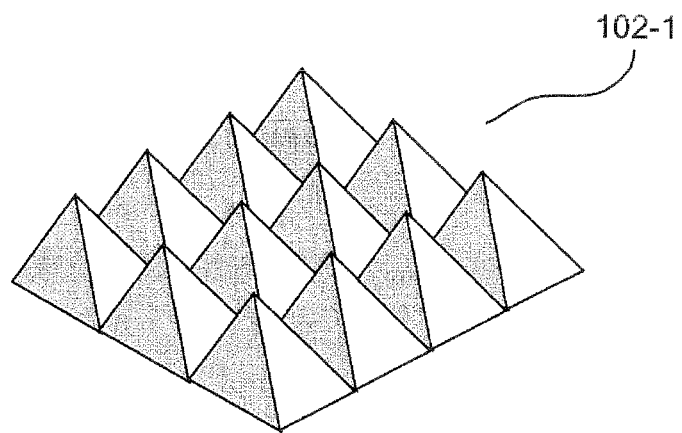
FIGS. 6a and 6b represent two examples of reflecting polarizer of the type with reflecting facets which can be used in a lighting device in accordance with the second embodiment.
Figure 6B:
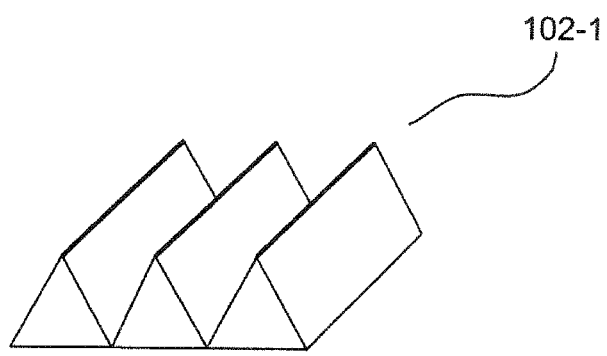

In practice, and as illustrated in FIGS. 5 and 6a, the relief structure 102-1 which makes it possible to obtain the reflecting facets can be as already stated a structure having square-based pyramids. Another possible relief structure for making a reflecting polarizer such as this is a prismatic structure as illustrated in FIG. 6b, which is simpler to make but less effective.

Figure 7:
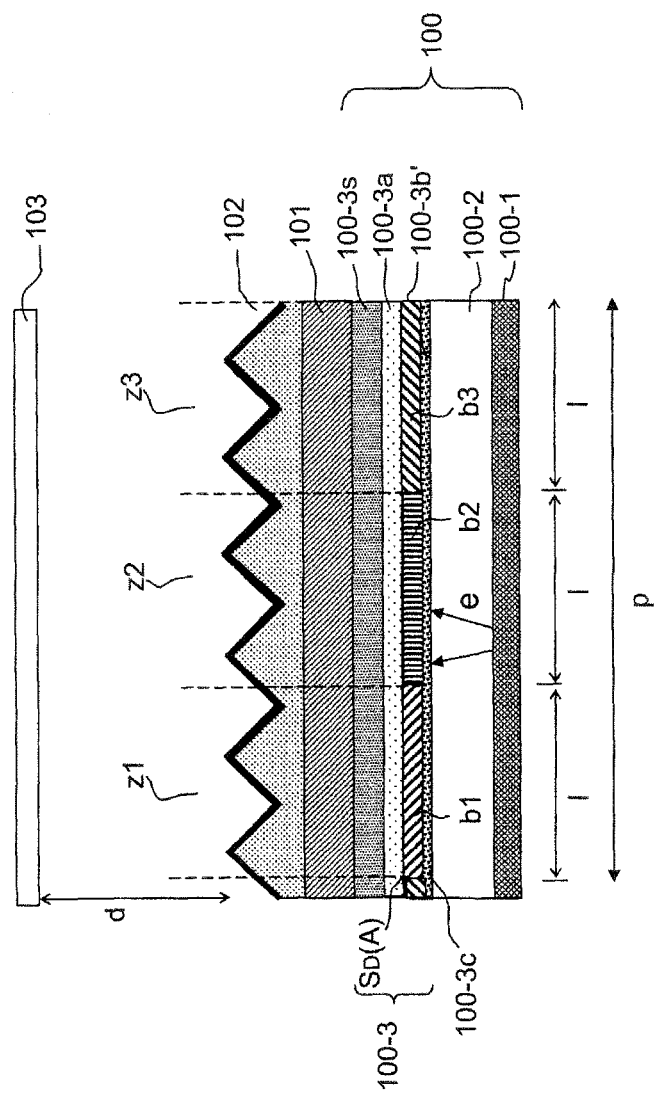
FIG. 7 illustrates a third embodiment of a lighting device according to the invention.
Figures 8A, 8B:
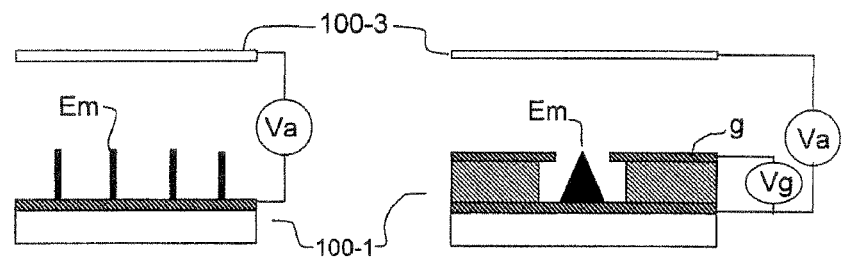
FIGS. 8a and 8b illustrate in a schematic manner a field-effect device respectively of diode and triode type which can be used in a lighting device according to the invention.

FIG. 7 illustrates another embodiment of the invention. In this embodiment, the phosphor layer 100-3b' is structured as a series of bands of phosphors of different colors. Typically it is thus possible to have at least two types of phosphors which will emit photons in different wavelengths. In the example illustrated, three different phosphors are used to emit respectively in the red, the green and the blue. A band b1 of "red" phosphor, a band b2 of "blue" phosphor, a band b3 of "green" phosphor are thus alternated in succession, typically periodically, with a spacing p (corresponding to the sum of the widths l of these three bands).

As illustrated in this same FIG. 7, the lighting device can comprise a reflecting-facets polarizer and a cathode of the light source of the matrix-structure triode type, allowing differentiated control of each color band. It is thus possible to create zones z1, z2, z3 of variable luminances by controlling in a differentiated manner the various emission zones of the cathode 100-1 corresponding to the various bands.

In a refinement, the stack of optical thin layers of the polarizer is also treated in a differentiated manner as a function of these bands b1, b2, b3, so as to obtain a centered and optimized polarizing and reflecting treatment for each band, that is to say in accordance with the wavelength emitted by the phosphors of the corresponding band.

It is also possible to modulate (spatially) the illumination within one and the same color as a function of the content of an image and therefore to obtain zones z1, z2, z3 of spatially and temporally variable luminances: this advantageously makes it possible to produce an optimal color, lighting in each color, to reconstruct a color image: the lighting device according to the invention is then a polarized light source of variable color. In this case, there is no longer any need for colored filters in the structure of the screen.

Preferably, a diffuser element 103 is provided, disposed above the polarizer 102 and a distance d away, for averaging the non-uniformities of the colored luminous flux emitted. The distance d is of the order of magnitude of the spacing p of the bands of phosphors (p=sum of the widths l of the bands).

In a refinement of the invention making it possible to increase the gain of the device, a mirror layer for reflecting the photons toward the polarizer is provided under the phosphor layer of the lighting device, between this layer and the electron emitters. Such a mirror layer must make it possible to reflect the photons while remaining transparent in respect of the electrons. This layer can be for example an aluminum layer (typically of 100 nm). A mirror layer 100-3c is represented as an example in the structure of FIG. 7, under the phosphor layer 100-3b' (in the anode structure, this is the last layer, facing the cathode).

In the structures of FIGS. 4 and 5, this mirror layer would be made under the layer 100-3b (not illustrated). In practice, the process for making the anode then comprises a last step of depositing a mirror layer, on the phosphor layer.

The combination of the various elements of the diffuse lighting device which has just been described makes it possible to provide a partially polarized light for the rear lighting of a liquid crystal screen and makes it possible to limit the losses normally associated with the entrance polarizer of the latter. A powerful luminous energy suited to the high-luminance needs of displays is thus obtained, for much less electrical consumption than in the prior art displays.

The invention has been more particularly described with a light source 100 of the type with field emission and electroluminescence. The field emission device is preferably of the cold cathode type, notably of the nanotube type. But the invention can be embodied with any compatible luminous source technology for providing an extended light source, and which comprises a layer of high albedo, for example a plasma source.

The invention applies notably in an advantageous manner to large-format displays of high luminance and low consumption.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. A diffuse lighting device for transmissive liquid crystal screen, comprising:
    a luminous source of an extended flux of unpolarized light that comprises:
        a diffusing layer exhibiting a high albedo of at least greater than 0.3, on a light emission surface of said luminous source, and a stack of a quarter-wave plate and of a reflecting polarizer, wherein said stack is disposed on the luminous source, with at least one quarter-wave plate in said stack being arranged between the reflecting polarizer and the diffusing layer exhibiting the high albedo of the luminous source, wherein said reflecting polarizer is arranged such that light which does not cross said reflecting polarizer is at least in part reflected via said stacked quarter-wave plate toward said diffusing layer exhibiting the high albedo, and wherein the diffusing layer diffuses light back towards the reflecting polarizer via said stacked quarter-wave plate.

2. The diffusing lighting device as claimed in claim 1, wherein said diffusing layer exhibiting the high-albedo is a phosphor layer to form the light emission surface.

3. The diffusing lighting device as claimed in claim 2, wherein said phosphor layer is structured as a series of bands of different phosphors, each of the series of bands of different phosphors emits a different color.

4. The diffusing lighting device as claimed in claim 2, further comprising a mirror layer under the phosphor layer.

5. The diffusing lighting device as claimed in claim 1, wherein the reflecting polarizer is a grid polarizer.

6. The diffusing lighting device as claimed in claim 1, wherein the reflecting polarizer is a reflecting-facets polarizer formed by a stack of optical thin dielectric layers deposited on a relief structure.

7. The diffusing lighting device as claimed in claim 6, wherein the relief structure is a structure with prisms.

8. The diffusing lighting device as claimed in claim 6, wherein the relief structure is a structure with pyramids.

9. The diffusing lighting device as claimed in claim 1, wherein the diffusing lighting device is assembled on a rear face of the transmissive liquid crystal screen.

10. A diffusing lighting device for a transmissive liquid crystal screen, the diffusing lighting device comprising:
a luminous source of an extended flux of unpolarized light, wherein said luminous source is formed by a field-effect device associated with a phosphor diffusing layer exhibiting a high albedo of at least 0.3, said field-effect device comprising a cathode with an electron-emitting structure and a transparent anode opposite the cathode, the anode and the cathode being separated by a space in which a vacuum has been created, the transparent anode having a lower face facing the cathode and an upper face, the phosphor diffusing layer being formed on said lower face of the transparent anode facing the cathode; and
a stack of a quarter-wave plate and of a reflecting polarizer, disposed on the luminous source, above the upper face of the transparent anode, the stacked quarter-wave plate being arranged between the reflecting polarizer and said upper face of the transparent anode, wherein said reflecting polarizer is such that light which does not cross said reflecting polarizer is at least in part reflected via said stacked quarter-wave plate towards said phosphor diffusing layer exhibiting the high albedo, and wherein the phosphor diffusing layer diffuses light back towards the reflecting polarizer via said stacked quarter-wave plate.

11. The diffusing lighting device as claimed in claim 10, wherein the field-effect device further comprises an electron-extracting grid, disposed between the cathode and the transparent anode.

12. The diffusing lighting device as claimed in claim 10, wherein said electron-emitting structure of the cathode is a carbon-nanotubes structure.

13. A diffusing lighting device for transmissive liquid crystal screen, comprising:
a luminous source of an extended flux of unpolarized light comprises:
a diffusing layer exhibiting a high albedo of at least greater than 0.3, on a light emission surface of said luminous source, wherein said diffusing layer is structured as a series of bands of different phosphors, each of the series of bands of different phosphors emits a different color; and
a field effect device that comprises an electron-extracting grid disposed between a cathode and an anode; and
a stack of a quarter-wave plate and of a reflecting polarizer are disposed on the luminous source, wherein said reflecting polarizer is a reflecting-facets polarizer formed by a stack of optical thin dielectric layers deposited on a relief structure being such that the light which does not cross said reflecting polarizer is at least in part reflected via said quarter-wave plate toward said diffusing layer exhibiting the high albedo, and the reflecting polarizer comprises a plurality of independently addressable zones, each of the plurality of independently addressable zones corresponds to a band of the series of bands of different phosphors in order to obtain a luminance that varies as a function of color, and wherein the cathode has a structure enabling a separate addressing of a zone of the said plurality of independently addressable zones of the reflecting polarizer.

14. The diffusing lighting device as claimed in claim 13, wherein the reflecting polarizer is optimized by the series of bands of different phosphors as a function of an emission wavelength of each of the series of bands of different phosphors.

15. The diffusing lighting device as claimed in claim 13, wherein the cathode has a matrix structure allowing spatial and temporal differentiated control inside each of the plurality of independently addressable zones in order to modulate the illumination as a function of a content of an image.

16. The diffusing lighting device as claimed in claim 15, further comprising a diffuser disposed above the reflecting polarizer, flux emission side, and at a distance of an order of magnitude of the spacing of the series of bands of different phosphors.

* * * * *

UNITED STATES PATENT AND TRADEMARK OFFICE
CERTIFICATE OF CORRECTION

PATENT NO. : 8,675,150 B2  Page 1 of 1
APPLICATION NO. : 12/602940
DATED : March 18, 2014
INVENTOR(S) : Dijon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this
Twenty-ninth Day of September, 2015

Michelle K. Lee
*Director of the United States Patent and Trademark Office*